(12) United States Patent
Wong et al.

(10) Patent No.: US 8,898,029 B1
(45) Date of Patent: Nov. 25, 2014

(54) ADJUSTABLE VOLTAGE REGULATOR CALIBRATION CIRCUIT

(75) Inventors: Wilson Wong, San Francisco, CA (US); Allen Chan, San Jose, CA (US)

(73) Assignee: Altera Corporation, San Jose, CA (US)

( * ) Notice: Subject to any disclaimer, the term of this patent is extended or adjusted under 35 U.S.C. 154(b) by 233 days.

(21) Appl. No.: 13/046,626

(22) Filed: Mar. 11, 2011

(51) Int. Cl.
*G01D 18/00* (2006.01)

(52) U.S. Cl.
USPC ............................ 702/85; 702/118; 702/185

(58) Field of Classification Search
CPC . G01R 31/2853; G09G 3/006; G09G 2330/04
USPC ............................ 702/107, 117, 188, 185, 64
See application file for complete search history.

(56) References Cited

U.S. PATENT DOCUMENTS

| 7,188,036 | B2 * | 3/2007 | Strittmatter ...................... 702/57 |
| 2004/0070464 | A1 * | 4/2004 | Wong et al. ..................... 331/185 |
| 2006/0247873 | A1 * | 11/2006 | Fung et al. ....................... 702/64 |
| 2008/0122495 | A1 * | 5/2008 | Boerstler et al. ................ 327/82 |
| 2010/0005328 | A1 * | 1/2010 | Rakshani et al. .............. 713/322 |
| 2010/0109675 | A1 * | 5/2010 | Wong et al. ..................... 324/537 |
| 2010/0135100 | A1 * | 6/2010 | Chiu ......................... 365/233.11 |
| 2011/0291630 | A1 * | 12/2011 | Konstadinidis et al. ...... 323/283 |

* cited by examiner

*Primary Examiner* — John Breene
*Assistant Examiner* — Stephanie Bloss
(74) *Attorney, Agent, or Firm* — Womble, Carlyle, Sandridge & Rice

(57) ABSTRACT

An integrated circuit is presented. The integrated circuit includes a selection circuit that selects a reference voltage and an output voltage associated with a number of adjustable voltage regulators connected to the selection circuit. The integrated circuit also has an analog to digital converter, which converts the selected output voltage and the reference voltage to a digital representation. An analog state machine of the integrated circuit receives the digital representation from the analog to digital converter and compares the selected output voltage with the reference voltage.

20 Claims, 6 Drawing Sheets

ADJUSTABLE VOLTAGE REGULATOR CALIBRATION CIRCUIT

BACKGROUND

Circuits that are sensitive to noise typically use regulated and filtered voltage supplies, since the timing of these circuits can be affected by noise. The effect on timing is especially acute as data rates increase. For example, transceiver timing is extremely critical at high data rates and a transceiver clocking path can have noise sensitivity as high as 4 ps/mV with a corresponding bit period of less than 40 ps. If the clock supply voltage is higher than the data supply voltage, the clock path will be faster than expected which could possibly violate a hold time requirement.

SUMMARY

Accordingly, there is a need to closely match the supply voltages of the clock and data paths in order to ensure meeting setup and hold time requirements when crossing voltage domains. Embodiments of the present invention enable dynamically adjusting the output voltage of adjustable voltage regulators to a reference voltage. In one embodiment, a common circuit adjusts all of the output voltages based on a comparison between each output voltage and a stored value of the reference voltage. It is appreciated that the present invention can be implemented in numerous ways, including as a method, a system, or a device. Several exemplary embodiments of the present invention are described below.

In accordance with one exemplary embodiment, an integrated circuit is detailed. The integrated circuit includes a selection circuit that selects a reference voltage and an output voltage associated with a number of adjustable voltage regulators connected to the selection circuit. The integrated circuit also has an analog to digital converter, which converts the selected output voltage and the reference voltage to a digital representation. An analog state machine of the integrated circuit receives the digital representation from the analog to digital converter and compares the selected output voltage with the reference voltage.

In accordance with another exemplary embodiment, a method of dynamically calibrating an output voltage of an adjustable voltage regulator to a reference voltage is provided. The method selects a reference voltage and an analog voltage that corresponds to an output voltage of an adjustable voltage regulator. The analog voltage selection is based on a sequence of selection bits. The reference voltage is compared to the selected output voltage and the selected output voltage is recursively adjusted based on the comparison of the reference voltage with the selected output voltage.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

The following embodiments describe an exemplary apparatus and method for dynamically adjusting the output voltage of adjustable voltage regulators to a reference voltage. It will become obvious, however, to one skilled in the art, that the present invention may be practiced without some or all of these specific details. In other instances, well known process operations have not been described in detail in order not to unnecessarily obscure the present invention.

Figure 1:
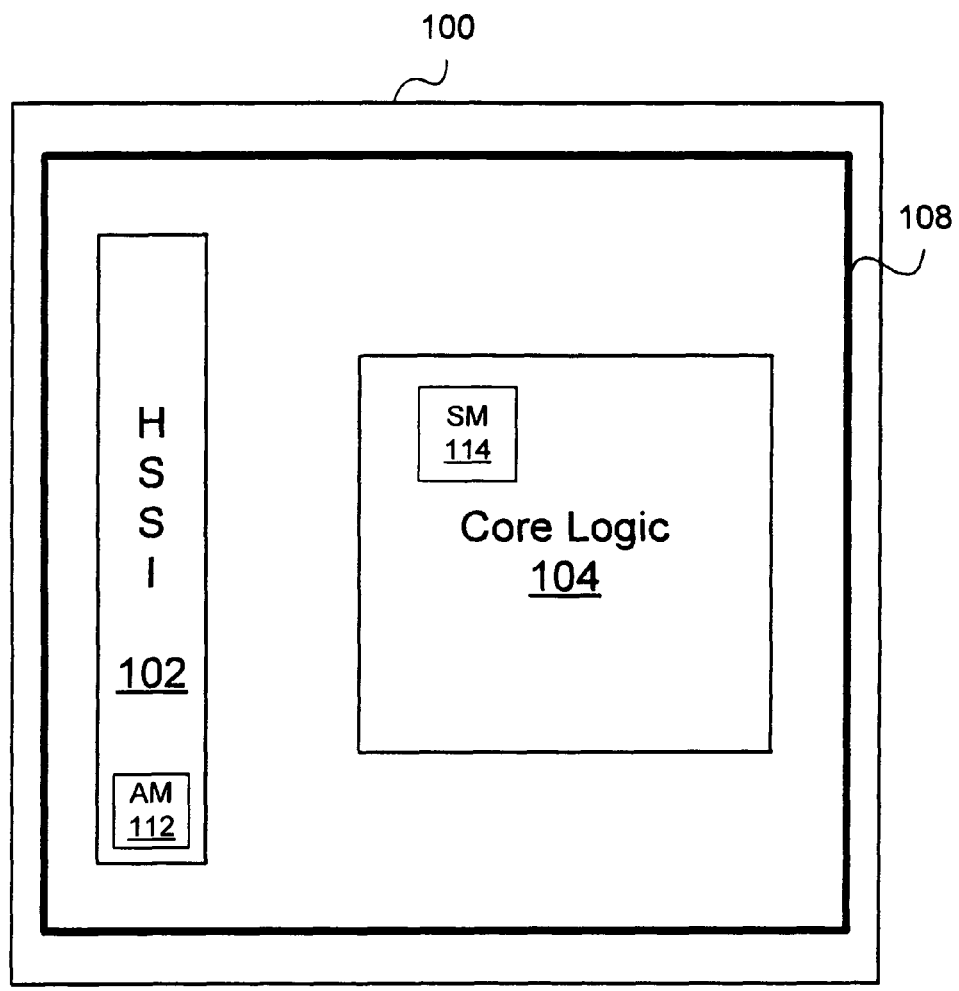
FIG. 1 illustrates an exemplary simplified schematic diagram of an integrated circuit utilizing circuitry capable of dynamically calibrating output voltages of adjustable voltage regulators, in accordance with one embodiment of the present invention.

FIG. 1 illustrates an exemplary simplified schematic diagram of an integrated circuit utilizing circuitry capable of dynamically calibrating output voltages of adjustable voltage regulators, in accordance with one embodiment of the present invention. An integrated circuit (IC) 100, such as a processor, a field programmable gate array (FPGA) or an application specific integrated circuit (ASIC), includes a high speed serial interface (HSSI) 102, as well as the core logic 104. In one embodiment, an analog multiplexer (AM) 112 provides access to analog voltages inside the high speed serial interface 102. The core logic 104 of the integrated circuit 100 includes an analog state machine 114. In another embodiment, the analog state machine 114 and analog MUX 112 are part of a calibration circuit. The input/output (I/O) ring 108 contains circuits which transmit and receive signals between the core logic 104 and the HSSI 102, and the rest of the system. It is appreciated that any known I/O standards may be supported by the input/output circuitry of the I/O ring 108, such as LVDS, TTL, etc. standards.

Figure 2:
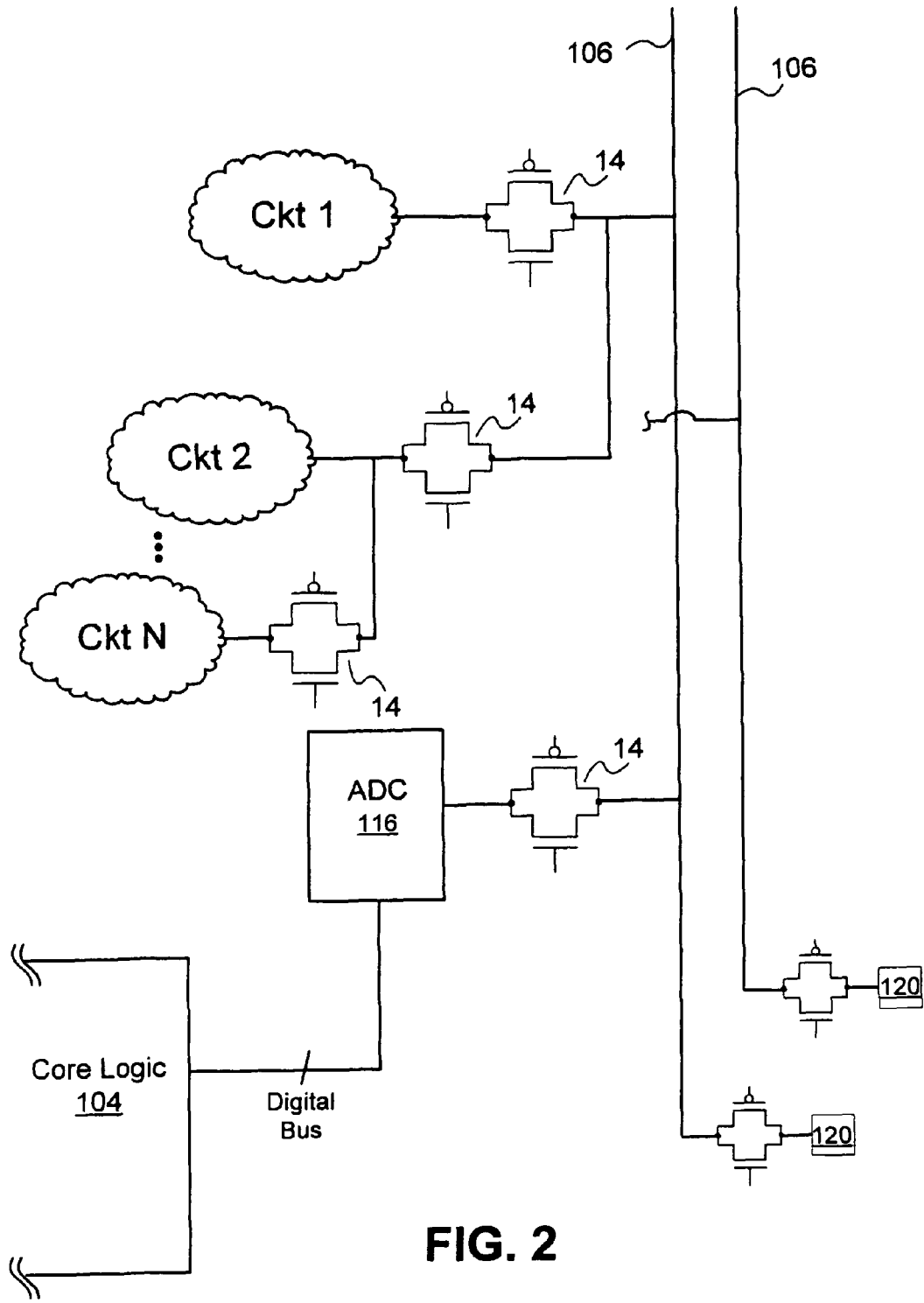
FIG. 2 illustrates an exemplary portion of an analog test bus with a calibration circuit, in accordance with one embodiment of the present invention.

FIG. 2 illustrates an exemplary portion of an analog test bus with a calibration circuit, in accordance with one embodiment of the present invention. A number of circuits, Ckt 1-N, from various analog blocks of the integrated circuit are coupled to the analog test bus 106 through complimentary metal oxide semiconductor (CMOS) passgates 14. It is appreciated that the CMOS passgates 14 enable access to analog voltages of Ckt 1-N, and allow analog levels between the power supply voltage and ground to be transmitted by the analog test bus 106 to bondpads 120 of the I/O ring. In one embodiment, the CMOS passgates 14 are part of the analog MUX 112 that enables the analog test bus 106 to selectively access analog voltages of circuits Ckt 1-N. The analog voltage transmitted on the analog test bus 106 may also be transmitted to an analog to digital converter (ADC) 116. The ADC 116 converts the analog voltage from the analog MUX into a digital representation. The digital representation of the analog voltage is transmitted by the ADC 116 to the core logic 104 of the integrated circuit through a multiple bit digital bus. In one embodiment, the core logic 104 includes the analog state machine and a lookup table for storing the digital representation of a reference voltage. In another embodiment, the calibration circuit includes the analog state machine and the analog MUX of FIGS. 1 and 5.

Figure 3:
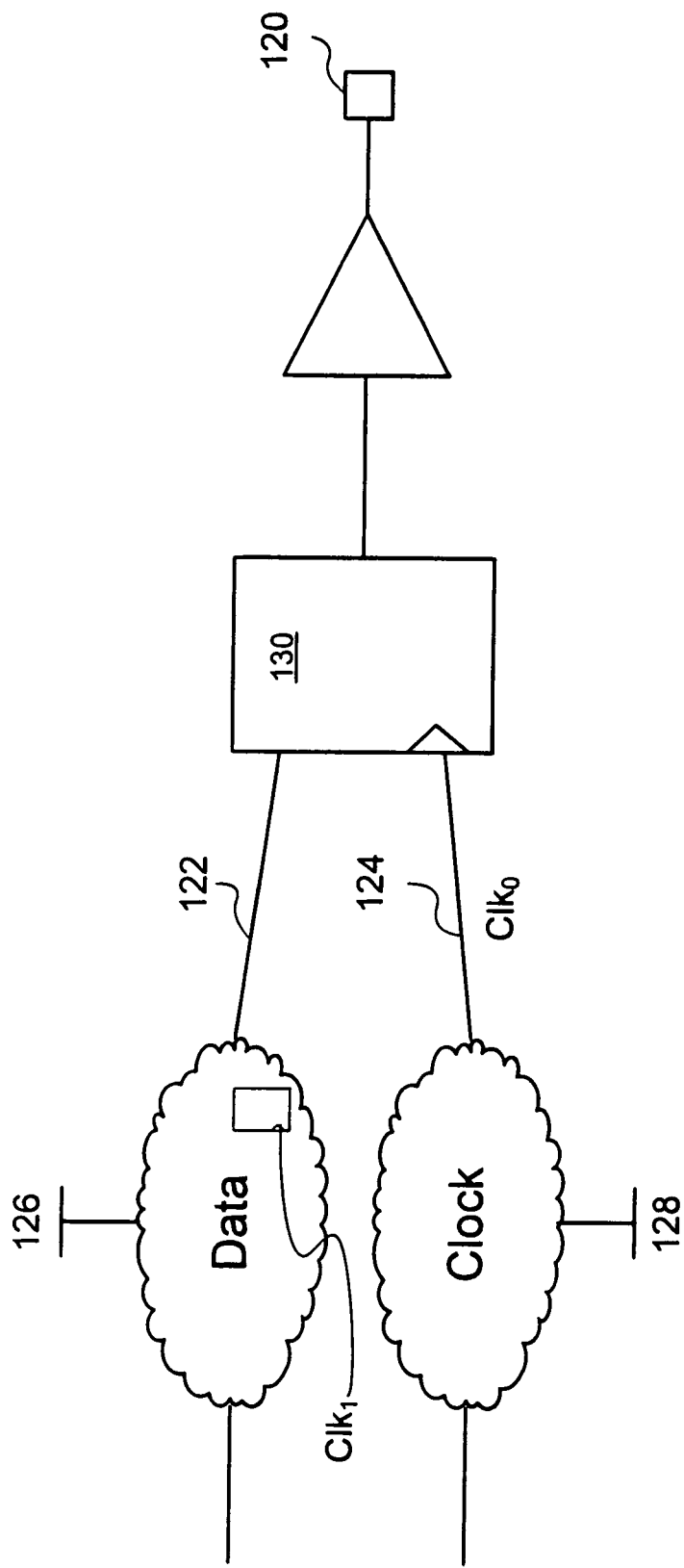
FIG. 3 depicts an exemplary schematic diagram of a data path and clock path of an integrated circuit that can be used to implement embodiments of the present invention.

FIG. 3 depicts an exemplary schematic diagram of a data path and clock path of an integrated circuit that can be used to implement embodiments of the present invention. As discussed above, the timing between the clock path 124 and data path 122 is especially sensitive at high data rates. Typically the signal on the data path 122 contains more noise than the clock signal $Clk_0$ on the clock path 124 because the signal on the data path 122 contains content at different frequencies that can contaminate the power supply 126. On the other hand, the clock signal $Clk_0$ on the clock path 124 contains content at a single frequency. Therefore, the regulated power supply 128 for the clock path 124 ensures signals on the clock path 124 are at a single frequency. By reducing the noise on the power supply 128 of the clock path 124, jitter on the signal at the bondpad 120 may be reduced. Noise reduction may be achieved by keeping a single frequency on the power supply 128 of the clock path 124 and the frequency of the clock signal $Clk_0$ is kept below the maximum clock frequency of the signal on the data path 122. In addition, the clock path 124 and data path 122 have a power supply 126 and 128 associated with each path 122 and 124, respectively. As discussed above, a voltage difference between the power supplies 126 and 128 of the clock path 124 and data path 122 can lead to hold time violations at the circuitry 130 used to clock the data signal to bondpads 120 of the I/O ring.

Figure 4:
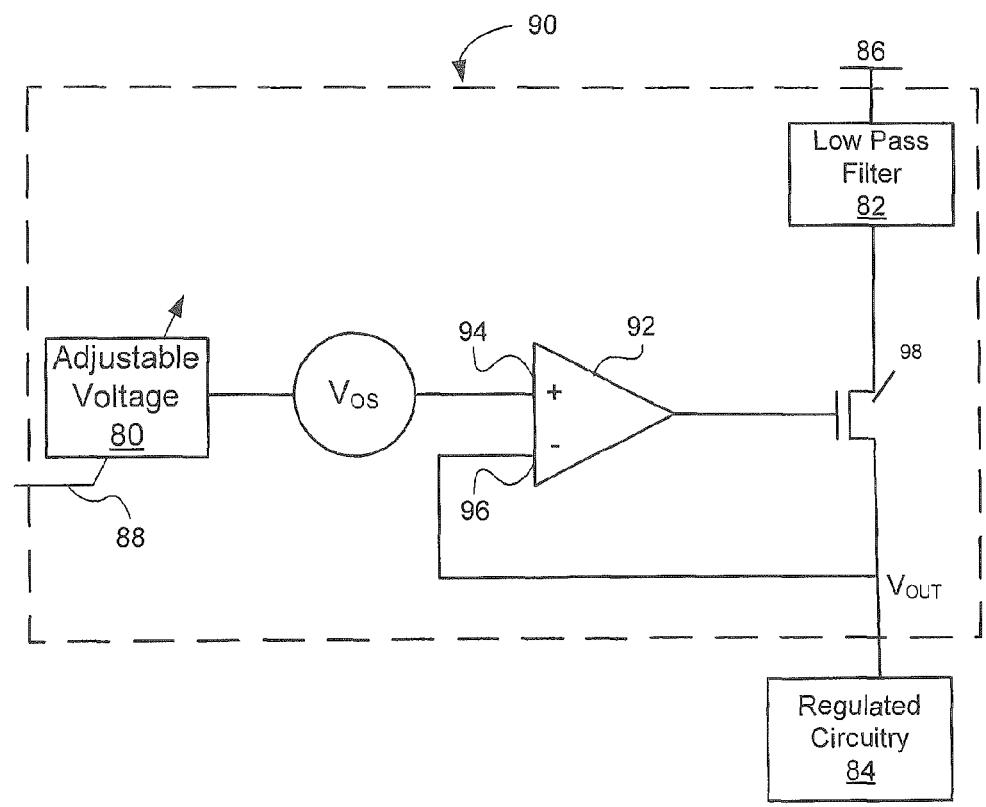
FIG. 4 depicts an exemplary schematic diagram of an adjustable voltage regulator, in accordance with one embodiment of the present invention.

FIG. 4 depicts an exemplary schematic diagram of an adjustable voltage regulator, in accordance with one embodiment of the present invention. The adjustable voltage regulator 90 has an adjustable reference voltage source 80 that provides an input voltage, and a multiple bit control bus 88 coupled to the adjustable voltage source 80 that enables adjustments to the value of the adjustable voltage source 80. The output voltage, $V_{out}$, of the adjustable voltage regulator 90 is transmitted to the regulated circuitry 84. The adjustable voltage regulator 90 also has a low pass filter 82 which is tied to the voltage supply 86 of the adjustable voltage regulator 90. It is appreciated that a voltage supply 86 with a higher voltage than the adjustable voltage source 80 provides headroom in generating $V_{out}$. It is further appreciated that voltage regulator designs often use voltage headroom for implementation of the low pass filter 82 and to accommodate the voltage drop across transistor 98.

In addition, the adjustable voltage regulator 90 has an associated offset voltage. The offset voltage has a random component that is a result of process variation. It is appreciated that the term process variation encompasses variations in attributes of transistors, e.g., gate length, channel width, oxide thickness, etc., that occur during the manufacturing process. Process variations are especially significant for advanced process nodes as the amount of process variation becomes a larger percentage of the transistor attributes. The offset voltage of the adjustable voltage regulator 90 is shown schematically in FIG. 4 as a voltage source $V_{os}$. The voltage of the adjustable voltage source 80 and voltage source $V_{os}$ are transmitted to positive input 94 of an operational amplifier (op-amp) 92, which forces the negative input 96 to be equal to the voltage at the positive input 94. It is appreciated that the output voltage, $V_{out}$, of the adjustable voltage regulator 90 is the sum of the voltage from the adjustable voltage source 80 and the offset voltage, $V_{os}$. Therefore, the offset voltage causes variability in the output voltage of the different adjustable voltage regulators 90 distributed throughout the integrated circuit.

Figure 5:
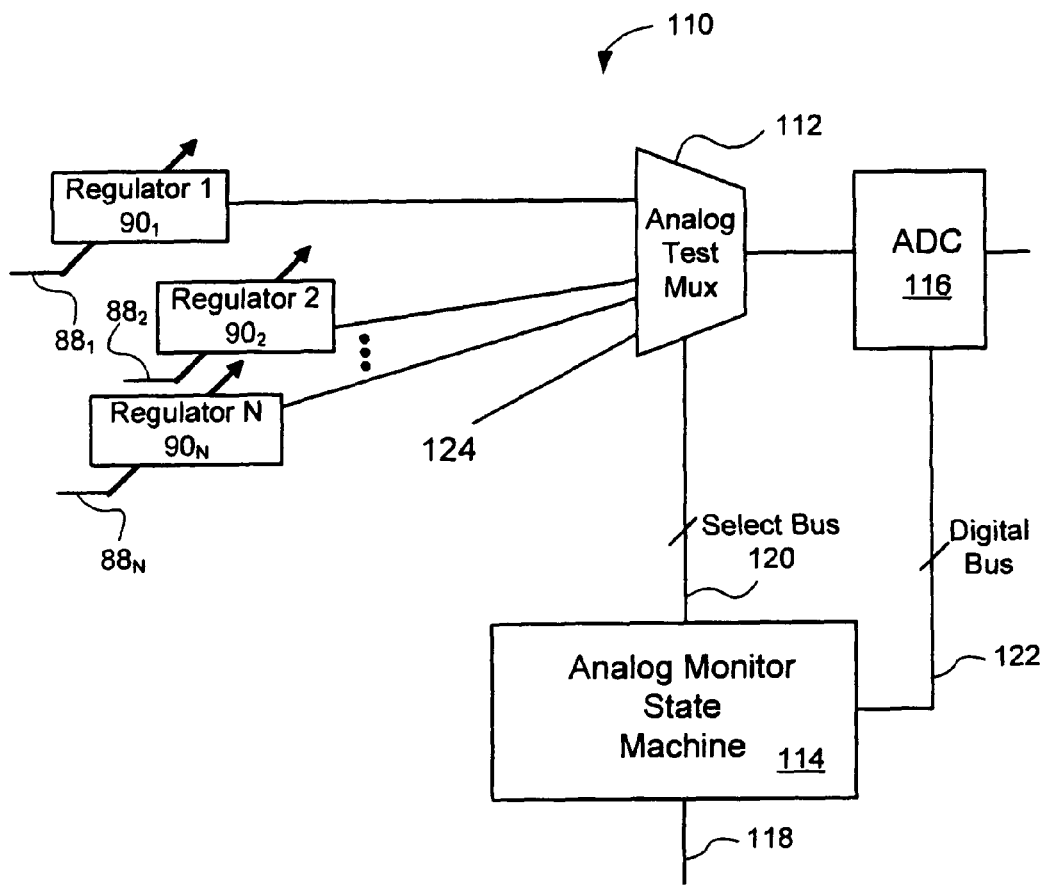
FIG. 5 illustrates an exemplary calibration circuit for dynamically adjusting the output voltage of adjustable voltage regulators to a reference voltage, in accordance with one embodiment of the present invention.

FIG. 5 illustrates an exemplary calibration circuit for dynamically adjusting the output voltage of adjustable voltage regulators to a reference voltage, in accordance with one embodiment of the present invention. The calibration circuit 110 includes an analog multiplexer 112 and an analog state machine 114. The analog multiplexer 112 has analog inputs connected to the output of a number of adjustable voltage regulators $90_1$-$90_N$ and a voltage source 124. In one embodiment, the voltage source 124 serves as a reference voltage. In another embodiment, the voltage source 124 is the power supply of a data path, as illustrated in FIG. 3. The analog multiplexer 112 also receives a number of selection bits through a multiple bit selection bus 120, which dynamically controls which analog input is selected by the analog MUX 112 and enables random access to each adjustable voltage regulator $90_1$-$90_N$ and the voltage source 124 connected to the analog inputs. The selected analog voltage is transmitted by the analog multiplexer 112 to the ADC 116.

The analog state machine 114 contains a digital logic circuit to generate an address associated with one of the analog inputs of the analog MUX 112 and generates the selection bits from the address. In one embodiment, the analog state machine 114 can be implemented off-chip via a microprocessor. The analog state machine 114 transmits the selection bits to the analog multiplexer 112 through the multiple bit selection bus 120. In one embodiment, the number of bits of the selection bus 120 corresponds to the number of selection bits needed to select the entire range of the analog inputs of the analog multiplexer 112. In another embodiment, the analog state machine 114 has a default sequence of selecting the output voltage associated with each adjustable voltage regulators $90_1$-$90_N$, as well as the reference voltage 124, through the analog MUX 112. In yet another embodiment, the analog monitor state machine 114 is connected to a control input 118, which can be used to reconfigure the default sequence of successively selecting the analog inputs of the analog MUX 112.

The calibration circuit 110 further includes an analog to digital converter (ADC) 116 converting the selected analog voltage from the analog test multiplexer 112 into a digital representation. The analog to digital converter 116 converts the selected analog voltage from the output of the analog multiplexer 112 into a digital representation, which can be transmitted through a multiple bit digital bus 122 and processed by the analog state machine 114. In one embodiment, the analog state machine 114 stores the digital representation of the reference voltage. In another embodiment, the digital representation of the reference voltage is stored in a lookup table implemented in the core logic of the integrated circuit. In yet another embodiment, the ADC 116 is located off-chip and the digital output of the analog to digital converter 116 is routed back to the integrated circuit and is connected to the core logic of a programmable logic device, such as a field programmable gate array (FPGA).

When the analog state machine 114 selects the output voltage of one of the adjustable voltage regulators $90_1$-$90_N$, the analog state machine 114 accesses the stored digital representation of the reference voltage which is compared to the digital representation of the selected output voltage. Based on this comparison, the analog state machine 114 generates a control signal to adjust the adjustable voltage source of the selected adjustable voltage regulator $90_1$-$90_N$ in voltage step increments. In one embodiment, the control signal is a sequence of control bits transmitted to the selected adjustable voltage regulator $90_1$-$90_N$ through a multiple bit control bus $88_1$-$88_n$.

In another embodiment, the voltage step increment of the selected adjustable voltage regulator $90_1$-$90_N$ is determined by the number of control bits. It is appreciated that the voltage step is a function of the voltage range of the respective adjustable voltage regulator $90_1$-$90_N$ and the number of voltage steps that can be described by the number of control bits. For a control signal with a width of M bits, the number of states that can be described is $2^M$ and the voltage step is the desired voltage range of the adjustable voltage regulator $90_1$-$90_N$ divided by $2^M$. For example, if the adjustable range of the adjustable voltage regulators $90_1$-$90_N$ is 200 millivolts, the corresponding voltage step is $0.2/2^M$ volts.

The output voltage of the selected adjustable voltage regulator $90_1$-$90_N$ is recursively compared to the reference voltage and the voltage of the adjustable voltage source of the selected adjustable voltage regulator $90_1$-$90_N$ adjusted based on the comparison until the output voltage is within a voltage step of the reference voltage. In one embodiment, the analog state machine 114 includes a comparator (not shown) that receives the digital representation of each analog voltage, which may be compared with the digital representation of the reference voltage stored in the lookup table. An output of the comparator provides a signal indicating which of the reference voltage or the selected output voltage is larger. The analog state machine 114 may select an appropriate voltage of the adjustable voltage source by selecting output from an adjustable voltage regulator $90_1$-$90_N$ in response to the output of the comparator.

In other words, the comparator of the analog state machine 114 acts as a common circuit to compensate for the offset voltage of each adjustable voltage regulator $90_1$-$90_N$ and calibrate the output voltage to the reference voltage by adjusting the adjustable voltage source of each adjustable voltage regulator $90_1$-$90_N$. It is appreciated that using a common comparator to calibrate the output voltage of the adjustable voltage regulators $90_1$-$90_N$ substantially negates any voltage offset between the reference voltage and the output voltage adjustable regulator present in the comparator, as all the calibrations of the adjustable voltage regulators $90_1$-$90_N$ will have the same voltage offset. In another embodiment, the analog state machine successively selects each of the adjustable voltage regulators $90_1$-$90_N$, so that the output voltage of each voltage regulator $90_1$-$90_N$ is matched to the reference voltage.

Figure 6:
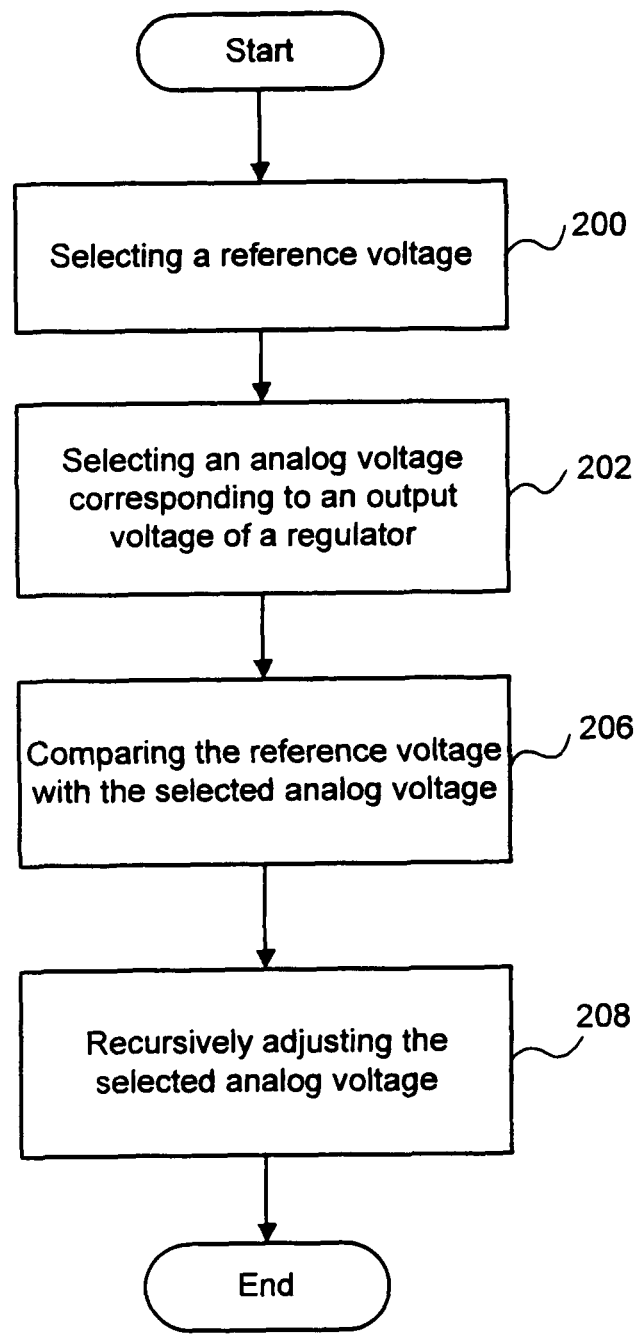
FIG. 6 is an exemplary flow chart diagram illustrating method operations for dynamically calibrating an output voltage of an adjustable voltage regulator to a reference voltage, in accordance with one embodiment of the present invention.

FIG. 6 is an exemplary flow chart diagram illustrating method operations for dynamically calibrating an output voltage of an adjustable voltage regulator to a reference voltage, in accordance with one embodiment of the present invention. The method begins with operation 200, where a reference voltage is selected. In one embodiment, an analog input of an analog test multiplexer is connected to the reference voltage, as illustrated in FIG. 4. In another embodiment, the reference voltage is a power supply of a data path, as illustrated in FIG. 3. In operation 202, an analog voltage corresponding to an output voltage of an adjustable voltage regulator is selected. In one embodiment, logic of analog monitor state machine generates a sequence of selection bits that is transmitted to the analog test MUX through a selection bus, as illustrated in FIG. 4. The selection bits are an address that corresponds to a particular analog input of the analog test multiplexer. In another embodiment, the analog state machine successively selects each of the analog voltages in a default sequence.

The reference voltage and the selected analog voltage are compared in operation 206. In one embodiment, the analog state machine accesses a digital representation of the reference voltage stored in a lookup table, which is compared with the digital representation of the selected output voltage. Operation 208 recursively adjusts the selected analog voltage to match the reference voltage. In one embodiment, the selected analog voltage is adjusted through a control bus that adjusts the adjustable voltage source of the adjustable voltage regulator. In another embodiment, the adjustment terminates once the selected voltage is within a voltage step of the reference voltage, where the voltage step of the adjustable voltage regulator is a function of the number of control bits of the control bus of the adjustable voltage regulator.

Table 1, in one example, illustrates adjusting the output voltage of two adjustable voltage regulators to a reference voltage if the reference voltage has a value of 1.01 volts, and Regulator1 has an initial output voltage of 1.05 volts and Regulator2 has an initial output voltage of 0.98 volts. Assuming each adjustable voltage regulator has a voltage step of 0.02 V, and the ADC resolves a voltage to 0.01 V accuracy, the analog state machine should decrease the output voltage of Regulator1 by 0.04 volts and increase the output voltage of Regulator2 by 0.04 volts, due to the voltage step of the adjustable voltage regulators, which is 0.02 volts.

The output voltage of the adjustable voltage regulators is recursively adjusted and compared to the reference voltage until the output voltage of each adjustable voltage is within a range of the reference voltage, where the range is defined by the voltage step. As illustrated in Table 1, after adjustment, the output voltage of Regulator1 is 1.01 volts, which matches the reference voltage. After adjustment, the output voltage of Regulator2 is 1.02 volts. In this example, the output voltage of Regulator2 is adjusted to 1.02 volts, which is a value that is within a voltage step of the reference voltage.

TABLE 1

|  | $V_{reference}$ | Regulator1 | Regulator2 |
|---|---|---|---|
| ADC value before | 1.01 | 1.05 | 0.98 |
| ADC value after | 1.01 | 1.01 | 1.02 |

The method and apparatus described herein may be incorporated into any suitable circuit, including processors and programmable logic devices (PLDs). The PLDs can include programmable array logic (PAL), programmable logic arrays (PLAs), field programmable logic array (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the PLDs owned by the assignee.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An integrated circuit comprising:
    a plurality of adjustable voltage regulators;
    a selection circuit operable to select one of a reference voltage or a voltage of a voltage regulator from the plurality of adjustable voltage regulators to form a selected output voltage, the reference voltage is a power supply voltage of a data path, the voltage regulator is a power supply of a clock path;
    an analog to digital converter operable to convert the selected output voltage to form a digital selected output voltage, wherein said analog to digital converter is further operable to convert the reference voltage to form a digital reference voltage; and
    a state machine operable to receive the digital selected output voltage and the digital reference voltage from the analog to digital converter, wherein the state machine is further operable to determine whether the digital selected output voltage, formed with the selection circuit selecting the voltage of the voltage regulator, matches the digital reference voltage and to adjust the voltage regulator that is the power supply of the clock path until a power supply voltage of the clock path is within a predefined range of the power supply voltage of the data path wherein the predefined range is determined by a number of control bits.

2. The integrated circuit of claim 1, wherein the state machine further comprises:
    a comparator operable to compare the digital reference voltage and the digital selected output voltage, and wherein the state machine is operable to recursively adjust the selected output voltage based on an output of the comparator.

3. The integrated circuit of claim 1, wherein the state machine further comprises:
    a lookup table operable to store the digital reference voltage.

4. The integrated circuit of claim 3 further comprising:
    a core logic of a programmable logic device coupled to an output of the analog to digital converter, wherein the state machine and the lookup table are implemented in the core logic of the programmable logic device.

5. The integrated circuit of claim 1, wherein the state machine is operable to provide a selection signal to the selection circuit for selecting one of the reference voltage or a new voltage of a voltage regulator from the plurality of adjustable voltage regulators to form an updated selected output voltage.

6. The integrated circuit of claim 1, wherein each of the adjustable voltage regulators further comprises:
    a control bus having a width greater than one bit, the control bus coupled to the analog state machine.

7. The integrated circuit of claim 1, wherein the state machine is operable to successively select each of the plurality of output voltages associated with the plurality of adjustable voltage regulators and the reference voltage through the selection circuit.

8. The integrated circuit of claim 1, wherein:
    the integrated circuit is implemented in a programmable logic device;
    a clock of the clock path is operable to clock a portion of the data path; and
    the state machine is further operable to match the voltage of the voltage regulator to the reference voltage, which matches the power supply of the clock path to the power supply of the data path.

9. A calibration circuit comprising:
    an analog multiplexer having a plurality of input terminals, the plurality of input terminals coupled to a reference voltage and an output voltage associated with an adjustable voltage regulator, the reference voltage is a supply voltage of a data path, the output voltage is a supply voltage of a clock path; and a state machine having a lookup table for storing a digital value of the reference voltage, wherein the state machine is operable to compare the output voltage to the stored digital reference voltage, and wherein the state machine is operable to adjust the output voltage until the supply voltage of the clock path is within a predefined range of the supply voltage of the data path, based on the comparison by transmitting a control signal to the adjustable voltage regulator, wherein the predefined range is determined by a number of control bits.

10. The calibration circuit of claim 9, wherein the adjustable voltage regulator further comprises:

a control input operable to receive the control signal from the state machine for adjusting the output voltage of the adjustable voltage regulator, wherein a voltage step of the adjustable voltage regulator is determined by a number of bits associated with the control signal.

11. The calibration circuit of claim 10, wherein the state machine is operable to terminate adjusting the output voltage when the output voltage is within a range of the reference voltage, wherein the range is defined by the voltage step.

12. The calibration circuit of claim 10, wherein the analog multiplexer is coupled to an analog test bus, wherein the analog test bus is operable to provide selective access to the output voltage through a bondpad.

13. The calibration circuit of claim 9, wherein the analog multiplexer further comprises:

a plurality of address inputs operable to receive a plurality of selection bits from the state machine, wherein the plurality of selection bits is used to select one of the output voltage or the reference voltage.

14. The calibration circuit of claim 9, wherein:

the reference voltage is a power supply for a data path;

the adjustable voltage regulator is one of a plurality of adjustable voltage regulators coupled to the analog multiplexer;

a portion of the data path is clocked by a clock from the clock path; and the output voltage is recursively adjusted until the supply voltage of the data path matches the supply voltage of the clock path to within a predetermined range.

15. The calibration circuit of claim 9, wherein the state machine further comprises:

a comparator operable to compare the stored reference voltage and the output voltage.

16. A method of dynamically calibrating an output voltage of an adjustable voltage regulator to a reference voltage, the method comprising:

selecting one of a plurality of analog voltages to form a selected output voltage, wherein each analog voltage of the plurality of analog voltages corresponds to an output voltage of an adjustable voltage regulator, wherein one analog voltage of the plurality of analog voltages is a power supply voltage of a clock path, wherein the selecting is based on a plurality of selection bits;

comparing a reference voltage with the selected output voltage, the reference voltage is a power supply voltage of a data path; and adjusting the adjustable voltage regulator corresponding to the analog voltage that is the power supply voltage of the clock path, until the power supply voltage of the clock path is within a predefined range of the power supply voltage of the data path wherein the predefined range is determined by a number of control bits.

17. The method of claim 16 further compromising:

cycling through a default sequence of the plurality of selection bits to select each of the plurality of analog voltages to compare with the reference voltage, the cycling including selecting the analog voltage provided by the power supply of the clock path, wherein an adjustable voltage regulator of the power supply of the clock path is recursively adjusted until the analog voltage provided by the power supply of the clock path is within the predefined range of the reference voltage.

18. The method of claim 16 further comprising:

receiving the plurality of selection bits from an analog monitor state machine, and wherein the selecting is performed in a successive manner.

19. The method of claim 16 further comprising:

converting the selected output voltage into a digital value; and transmitting the digital value of the selected output voltage to an analog monitor state machine.

20. The method of claim 19 further comprising:

storing a digital value of the reference voltage in a lookup table, wherein the comparing utilizes the stored digital value of the reference voltage and a digital value associated with the selected output voltage.

* * * * *